United States Patent [19]

Takada et al.

[11] Patent Number: 4,847,511
[45] Date of Patent: Jul. 11, 1989

[54] DEVICE FOR MEASURING RECTILINEAR MOTION

[75] Inventors: Koji Takada, Niigata; Kenji Magara, Tokyo; Yuzuru Nishiyama, Niigata, all of Japan

[73] Assignee: Chuo Precision Industrial Co., Ltd., Japan

[21] Appl. No.: 237,743

[22] Filed: Aug. 29, 1988

[30] Foreign Application Priority Data

Aug. 27, 1987 [JP] Japan .................. 62-213635
Aug. 27, 1987 [JP] Japan .................. 62-213636

[51] Int. Cl.⁴ .............................................. G01B 1/00
[52] U.S. Cl. .................................... 250/561; 356/152
[58] Field of Search ............. 250/561; 33/125 A, 286; 356/4, 141, 152

[56] References Cited

U.S. PATENT DOCUMENTS

| | | | |
|---|---|---|---|
| 3,953,133 | 4/1976 | Jacoby | 356/152 |
| 4,349,838 | 9/1982 | Daniel | 33/286 |
| 4,792,228 | 12/1988 | Haffner | 356/152 |
| 4,801,977 | 1/1989 | Ishizaka et al. | 356/152 |

OTHER PUBLICATIONS

"Precision Measurement of Rectilinear Motions by the Use of Laser Beam", by Takada et al., pp. 123–124; Scientific Lectures at 1984 Autumn Meeting of Precision Machinery Society.
"Advancing Inspection of Accuracy of Rectilinear Motions at Machining Center", Compiled by the Foundation for Promotion of Machine Tool Technology, May 1985.

Primary Examiner—David C. Nelms
Assistant Examiner—Stephone B. Allen
Attorney, Agent, or Firm—Wenderoth, Lind & Ponack

[57] ABSTRACT

Disclosed is a rectilinear motion measuring device which measures the X- and Y-axis displacement errors by detecting displacements of a rectilinearly moving body, while measuring the pitching and yawing errors by detecting the angle of inclination of the moving body and measuring the rolling error by detecting the displacement of the moving body at two different positions. For these purposes, the rectilinear motion measuring device is provided with means for detecting the displacement of the light source of a luminous flux generating means, means for detecting the displacements of the moving body on a magnified scale of ×2n, and means for detecting the angle of inclination of the rectilinearly moving body. On measuring the respective error components, the fluctuations of the light source are corrected to preclude variation factors of the light source itself, enhancing the resolution and the accuracy of the measurement by providing separately a displacement detecting optical path and an angle detecting optical path.

4 Claims, 8 Drawing Sheets

DEVICE FOR MEASURING RECTILINEAR MOTION

BACKGROUND OF THE INVENTION (1) Field of the Invention

This invention relates to a device for measuring rectilinear motions, which is useful, for example, for inspecting the accuracy of rectilinear motions of machine tools, optical devices, measuring devices and the like.

(2) Description of the Prior Art

Generally, the devices or apparatus which make rectilinear motions are provided with a movable table, for example, an X-axis table, X-Y-Z-axis table or the like. Therefore, in order to achieve an intended objective, it is a prerequisite of utmost importance to measure the accuracy of rectilinear motions of the device or apparatus with high precision.

In this connection, it is known that, when a rectilinearly moving body M like a machine tool is displaced along the Z-axis as illustrated in FIG. 12, there occur errors of six components, namely, a displacement error consisting of three components including a positioning error ez in the direction of the Z-axis, an error ex entailing the movement in the direction of X-axis and an error ey entailing the movement in the direction of the Y-axis, and an angular error consisting of three components including a pitching error $\alpha$ due to pitching about the X-axis, a yawing error $\beta$ due to yawing about the Y-axis and a rolling error $\gamma$ due to rolling about the Z-axis.

In this connection, we are aware of the following prior art literatures proposing rectilinear motion measuring devices which can simultaneously measure four of the above-mentioned six components, namely, the displacement error ex in the direction of the X-axis, the displacement error ey in the direction of the Y-axis, the pitching error $\alpha$ and the yawing error $\beta$.

(a) "Precision Measurement of Rectilinear Motions by the Use of Laser Beam" by Takada et al, pp. 123–124, Scientific Lectures at 1984 Autumn Meeting of Precision Machinery Society.

(b) "Advancihg Inspection of Accuracy of Rectilinear Motions at Machining Center" compiled by The Foundation for Promotion of Machine Tool Technology, May 1985.

In these prior art devices, a first polarizing beam splitter, a corner cube prism and a reflecting mirror are provided on the side of the rectilinearly moving body while providing coaxially a second polarizing beam splitter, a half mirror and a collimator lens on the side of the measuring device, and providing on the half mirror a laser beam generator for generating linearly polarized light and a quarter wavelength plate.

With such an arrangement, the luminous flux from the light source is passed through the quarter wavelength plate, half mirror and collimator lens and then split into a horizontally polarized component P and a vertically polarized component S by the first corner cube prism. By the corner cube prism, the vertically polarized component S forms reflected waves with a displacement of 2ΔS which is twice the displacement ΔS of the prism. The reflected waves are passed through the first polarizing beam splitter, collimator lens with a focal length f and half mirror, and, after being reflected by the second polarizing beam splitter, received by a 4-quadrant photosensor for detection of the displacement. The output signal of the photosensor is calculated as the X-axis and Y-axis displacement errors ex and ey.

Further, the horizontally polarized component P from the first polarizing beam splitter forms reflected waves with an angle of inclination which is two times as large as the angle of inclination $\theta$ of the reflecting mirror. The reflected waves are passed through the second polarizing beam splitter via the first corner cube prism, collimator lens and half mirror, and received by an angle detecting 4-quadrant photosensor as a displacement $d \approx 2\theta f$. The output signal of this photosensor is used to calculate the pitching error $\alpha$ and the yawing error $\beta$.

The above-described prior art devices have a number of inherent problems. Firstly, due to the large quantity of heat which occurs during the laser emission by the laser generator, the laser tube itself is thermally deformed with fluctuations in its laser output. Nevertheless, no measure is provided to prevent such fluctuations of the light source itself, which would impair the accuracy of the measurement.

Secondly, the reflected waves from the corner cube prism and the reflected waves from the reflecting mirror are passed along the same optical path, while transmitted through the collimator lens. Therefore, even if the corner cube lens is used to magnify the displacement ΔS of the rectilinearly moving body to a doubled scale 2ΔS, the magnified displacement is minimized as the reflected waves are transmitted through the collimator lens, resulting in low resolution of the displacement by the 4-quadrant photosensor.

Thirdly, of the six error components which occur to the rectilinearly moving body, it has been impossible to measure the rolling error Y when it is necessitated to measure same simultaneously with the above-mentioned four components.

SUMMARY OF THE INVENTION

With a view to overcoming the above-mentioned problems of the prior art, it is an object of the present invention to provide a device for measuring rectilinear motions, which can measure the factors of the four error components simultaneously with high accuracy.

It is another object of the invention to provide a device for measuring rectilinear motions, which is adapted to correct the errors attributable to fluctuations of a luminous flux generating means in the measurement of the factors of the respective error components to enhance the accuracy of the measurement.

It is a further object of the present invention to provide a rectilinear motion measuring device which employs separately a displacement detecting optical path and an angle detecting optical path and which can magnify the displacement of a rectilinearly moving body by 2n times, desirably, by four times for enhancing the accuracy of the measurement.

It is still another object of the invention to provide a rectilinear motion measuring device which can simultaneously measure the factors of five error components, including the rolling error in addition to the above-mentioned four error components.

In accordance with the present invention, the foregoing objects are achieved by the provision of a rectilinear motion measuring device which essentially includes:

a displacing prism and a reflecting mirror provided on the side of a rectilinearly moving body for movement therewith;

a luminous flux generating means for generating a luminous flux of linearly polarized light with a vibrational plane of a predetermined angle;

a corrective position detection means for detecting the displacement of the light source of the luminous flux generating means on the basis of the luminous flux projected therefrom;

a displacement magnifying means adapted to magnify the displacement of the displacing prism on the side of the rectilinearly moving body by reciprocating the luminous flux from the luminous flux generating means for n-times to and from the displacing prism to magnify the displacement of the prism by 2n times;

a position detection means for detecting the luminous flux led out on a magnified scale from the displacement magnifying means;

an angle transfer means adapted to reflect the luminous flux projected from the displacement magnifying means by the reflecting mirror on the side of the moving body, passing the reflected light through a lens to transfer the angle of inclination of the reflecting mirror;

an angle detection means for detecting the angle of inclination transferred thereto by said angle transfer means; and an arithmetic means adapted to calculate, on the basis of output signals of said corrective position detection means and the position detection means, displacement errors in the horizontal and vertical directions of said rectilinearly moving body, and, on the basis of output signal of said angle detection means, pitching and yawing errors of said moving body.

The above and other objects, features and advantages of the invention will become apparent from the following description, taken in conjunction with the accompanying drawings which show by way of example preferred embodiments of the invention.

BRIEF DESCRIPTION OF THE DRAWINGS

In the accompanying drawings:

FIGS. 1 through 8 illustrate a first preferred embodiment of the invention, of which FIG. 1 is a diagrammatic illustration showing the general configuration of the embodiment;

FIG. 2 is a diagram explanatory of the relationship of the output luminous flux of the laser generator with the horizontally and vertically polarized components;

FIG. 3 is a diagrammatic illustration showing the displacement magnifying and detecting operation by the first displacement magnifying means;

FIG. 4 is a diagrammatic illustration explanatory of the angle transferring operation by the angle transfer means;

FIG. 5 is a diagrammatic illustration showing the general configuration of the 4-quadrant photosensor;

FIG. 6 is a block diagram showing the general circuit arrangement of an arithmetic unit for computing the position of a light spot by the photosensor shown in FIG. 5;

FIG. 7 is a block diagram showing the circuit arrangement of an arithmetic unit which is employed in this embodiment for computing the respective error components; and FIG. 8 is a diagram explanatory of the principles of the error component computation;

FIGS. 9 through 11 illustrate a second embodiment of the present invention, of which:

FIG. 9 is a diagrammatic illustration of the general configuration of the embodiment;

FIG. 10 is a block diagram showing the circuit arrangement of an arithmetic unit which is employed in this embodiment for computing the respective error components; and FIG. 11 is a diagram explanatory of the principles of computation of the respective error components.

DESCRIPTION OF PREFERRED EMBODIMENTS

Hereafter, the invention is described more particularly by way of the preferred embodiments shown in the accompanying drawings.

Referring to FIGS. 1 through 8, there is shown a first embodiment of the invention.

Figure 1:
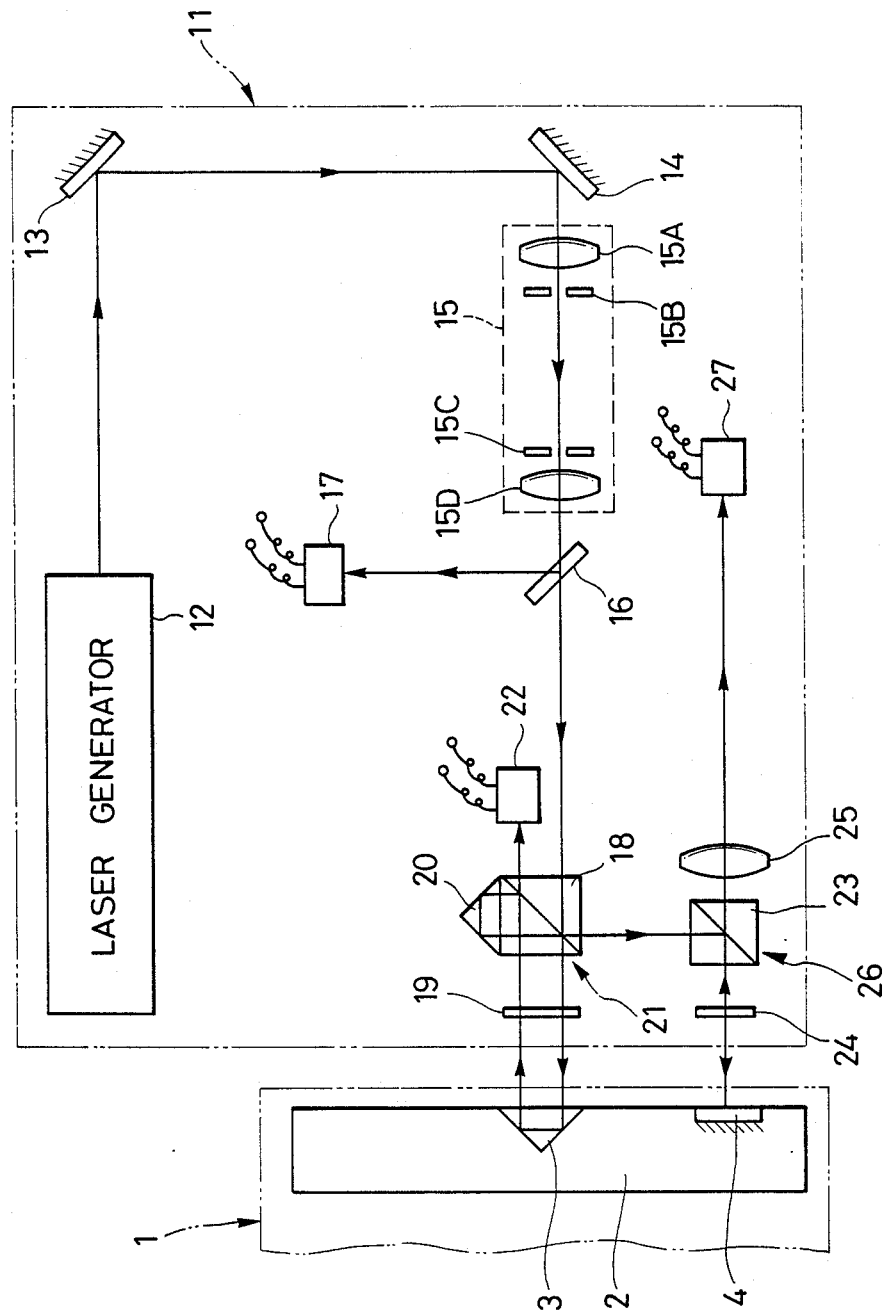

In FIG. 1 which shows the general configuration of the embodiment, designated at 1 is a rectilinearly moving body like a machine tool, and at 2 is a detector block which is mounted on the moving body 1. The detector block 2 is provided with a corner cube prism 3 for detection of the displacement and, in a position spaced from the corner cube prism 3, a reflecting mirror 4 for detection of the angle.

Figure 2:
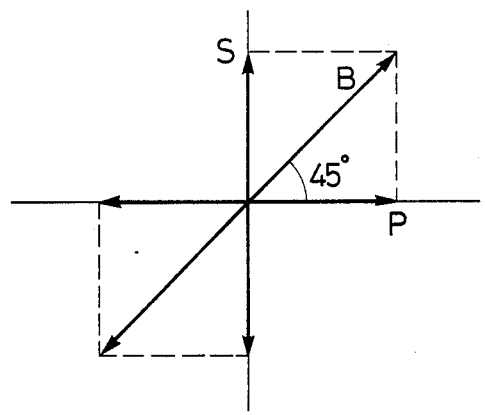

Further, denoted at 11 is the casing of a measuring device which measures the respective error components which occur to the rectilinearly moving body 1, the casing 11 being in the form of a movable carriage mounting thereon various components, which will be described hereinafter, in the positions shown. Indicated at 12 is a laser generator which employs, for example, an Ne-He laser source with an output of 3-10 mW. The luminous flux B which is projected from the laser source is linearly polarized light with a vibrational plane of 45° with respect to the face of the drawing as shown in FIG. 2, and dividable into a horizontally polarized component P and a vertically polarized component S by means of a polarizing beam splitter which will be described hereinafter.

The reference numerals 13 and 14 indicate reflecting mirrors which reflect the luminous flux from the laser generator 12 to turn its optical path toward the displacement detecting corner cube prism 3. At 15 is a luminous flux magnifier which magnifies the reflected luminous flux approximately by six times, the luminous flux magnifier 15 including a convex lens 15A, a pinhole 15B, an iris diaphragm 15C and another convex lens 15D.

Indicated at 16 is a half mirror which is located in the optical path in a position next to the luminous flux magnifier 15. The luminous flux reflected by he half mirror 16 is received by a 4-quadrant (two-dimensional) photosensor 17. At this stage, the photosensor 17 detects the displacement of the laser source, including the thermal deformation of the laser tube itself by the operation which will be described hereinafter, correcting the value detected by a position detecting 4-quadrant photosensor 22, which will also be described hereinafter, to determine the true error occurred to the rectilinearly moving body 1.

Designated at 18 is a polarizing beam splitter which is located next to the half mirror 16 and in the path of luminous flux projected from the luminous flux magnifier 15, and at 19 is a quarter-wave plate which is located between the polarizing beam splitter 18 and the displacement detecting corner cube prism 3 on the side of the detector block 2. At 20 is a displacement magnifying corner cube prism which is fixed on the upper member of the polarizing beam splitter 18. In this embodiment, a displacement magnifying means 21 is constituted by these polarizing beam splitter 18, quarter-wave plate 19, and corner cube prism 20. In this instance, the polarizing beam splitter 18 has properties of transmitting the horizontally polarized component P of the incident linearly polarized light, while reflecting the vertically polarized component S. On the other hand, the quarter-wave plate 19 converts the linearly polarized light into circularly polarized light, and circularly polarized light into linearly polarized light.

Figure 3:
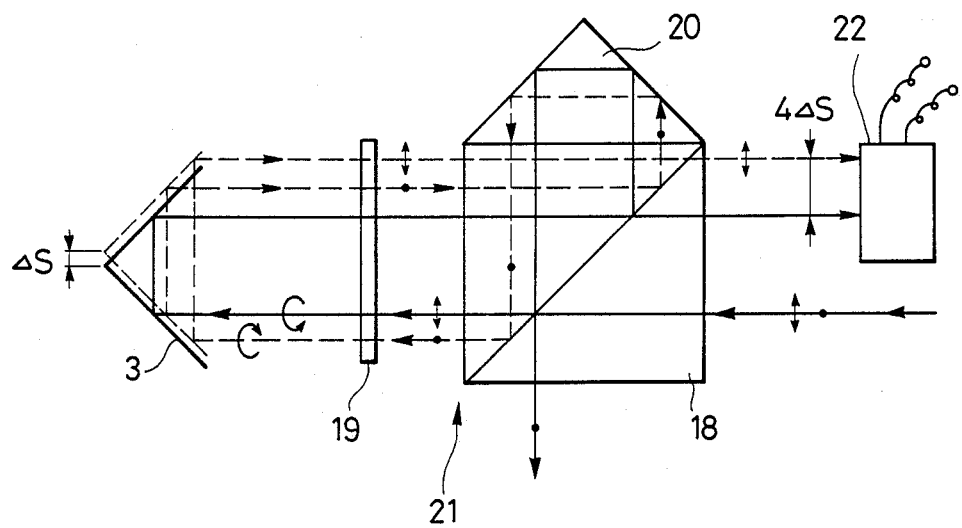

Now, the operation by the displacement magnifying means 21 with the above-described configuration is explained with reference to FIG. 3. In a case where the displacement detecting corner cube 3 is deviated from a correct position by ΔS due to a cause on the part of the rectilinearly moving body 1 as shown in FIG. 3, where the horizontally polarized component P of the linearly polarized light is expressed by "↕", the vertically polarized component by ".", the clockwise circularly polarized light by "↷" and the counterclockwise circularly polarized light by "↶". The linearly polarized light with a vibrational plane of 45°, which is incident on the polarizing beam splitter 18, is thereby divided into a horizontally polarized component P and a vertically polarized component S, the horizontally polarized component P alone being transmitted and passed through the quarter-wave plate 19. At this time, the horizontally polarized component P is converted into counterclockwise circularly polarized light. The circularly polarized light is reflected by the deviation detecting corner cube prism 3 which is displaced by ΔS, and passed again through the quarter-wave plate 19 to form a vertically polarized component S which enters the polarizing beam splitter 18 again. Then, the vertically polarized component S is reflected by the polarizing beam splitter 18 and by the displacement magnifying corner cube prism 20, the reflected component S entering the polarizing beam splitter 18 for the third time being thereby reflected and passed through the quarter-wave plate 19. Upon passing through the quarter-wave plate 19, the vertically polarized component S forms clockwise circularly polarized light, and reflected again by the displacement detecting corner prism 3, and passed through the quarter-wave plate 19 for the fourth time to form horizontally polarized component P which is directed toward the polarizing beam splitter 18. This horizontally polarized component P is transmitted through the polarizing beam splitter 18, thus travelling back and forth two times between the polarizing beam splitter 18 and the displacement detecting corner cube prism 3 to magnify the displacement ΔS of the corner cube prism 3 to a four times greater scale, namely, to 4ΔS.

On the other hand, denoted at 22 is a position detecting 4-quadrant (two-dimensional) photosensor which receives the luminous flux of the horizontally polarized component P transmitted through the polarizing beam splitter 18 which constitutes the aforementioned displacement magnifying means 21. The output signal of this photosensor is used for computation of the X-axis displacement error ex and the Y-axis displacement error ey which will be described hereinafter.

Indicated at 23 is another polarizing beam splitter to which the vertically polarized component S reflected from the polarizing beam splitter 18 is directed along a separate optical path, at 24 is another quarter-wave plate which is provided between the polarizing beam splitter 23 and the angle detecting reflecting mirror 4, and at 25 is a collimator lens of a focal length f which converges the luminous flux transmitted through the polarizing beam splitter 23 toward an angle detecting 4-quadrant photosensor 27 which will be described hereinafter. These polarizing beam splitter 23, quarter-wave plate 24 and collimator lens 25 constitute the angle transfer means 26 of this embodiment, which is located on the optical path containing the reflecting mirror 4 separately from the optical path of the displacement magnifying means 21.

Figure 4:
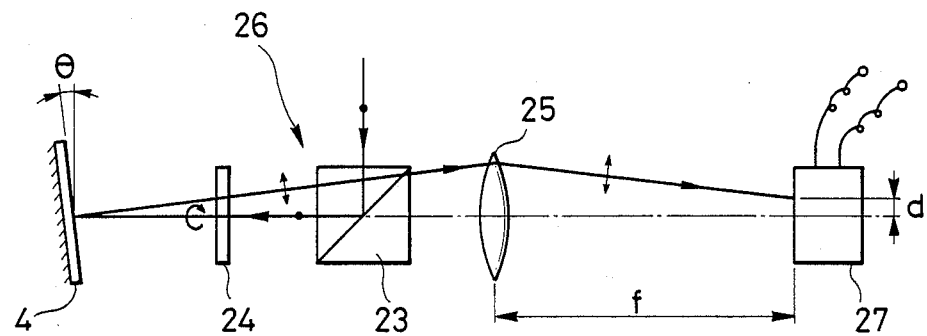

Now, the operation of the angle transfer means 26 is described with reference to FIG. 4. Of the linearly polarized light incident on the polarizing beam splitter 18, the vertically polarized component S which is reflected by the beam splitter 18 is directed toward and reflected by the other polarizing beam splitter 23, and then transmitted through the quarter-wave plate 24 to form clockwise circularly polarized light. This circularly polarized light is reflected by the angle detecting reflecting mirror 4 and transmitted again through the quarter-wave plate 24 to form a horizontally polarized component P, which is passed through the polarizing beam splitter 23 and refracted by the collimator lens 25 for focussing same on the angle detecting photosensor 27. Assuming that an angle of inclination $\theta$ exists in the angle detecting reflecting mirror 4, the displacement d at the angle detecting photosensor 27 is expressed as $$d \approx 2\theta f \qquad (1)$$

according to the principles of the autocollimator, converting the angle of inclination $\theta$ into the displacement d.

The angle detecting 4-quadrant (two-dimensional) photosensor 27 which receives the luminous flux from the angle transfer means 26 is located in a position corresponding to the focal length f of the collimator lens 25, for calculating the pitching and yawing errors $\alpha$ and $\beta$.

Now, the general configurations and operations of the aforementioned 4-quadrant photosensors 17, 22 and 27 are described with reference to FIG. 5.

The photosensor which is representatively shown at 100 consists of a silicon diode with a light receiving surface 101 and four electrodes a, b, c and d at its corners. When a light spot is cast on a certain position of the light receiving surface 101 as a sign 102, a charge is generated there and flows toward the respective electrodes a to d through the resistor layer. These currents are inversely proportional to the distances to the respective electrodes a to d, so that the position of the light spot 102 can be determined from the ratios of the respective currents to the total current.

Namely, assuming that the total photocurrent is $I\Sigma$ and the photocurrents of the electrodes a to d are Ia to Id, respectively, $$I\Sigma = Ia + Ib + Ic + Id \qquad (2)$$

If the photocurrents in + and − directions of the X-axis are Ix+ and Ix−, respectively, $$\begin{aligned} Ix+ &= Ia + Ib \\ Ix- &= Ic + Id \end{aligned} \right\} \qquad (3)$$

Therefore, the imbalance of the X-axis photocurrents relative to the total current $I\Sigma$ is expressed as $$\frac{Ix^+ - Ix^-}{I\Sigma} = \frac{(Ia + Ib) - (Ic + Id)}{Ia + Ib + Ic + Id} \quad (4)$$

If the distances between the centers of the photosensor on the X- and Y-axes and the electrodes are l, the distance X to the light spot 102 along the X-axis is expressed by the Equation (6) below.

$$\frac{X}{l} = \frac{Ix^+ - Ix^-}{I\Sigma} \quad (5)$$

$$\begin{aligned} X &= l \times \frac{Ix^+ - Ix^-}{I\Sigma} \\ &= l \times \frac{(Ia + Ib) - (Ic + Id)}{Ia + Ib + Ic + Id} \end{aligned} \quad (6)$$

Similarly, if the photocurrents in + and − directions of the Y−axis are Iy+ and Iy−, respectively, $$\begin{aligned} Iy+ &= Ia + Id \\ Iy- &= Ib + Ic \end{aligned} \quad (7)$$

and if the distance from the center of the photosensor to the light spot 102 along the Y-axis is Y, it is expressed as $$\begin{aligned} Y &= l \times \frac{Iy^+ - Iy^-}{I\Sigma} \\ &= l \times \frac{(Ia + Id) - (Ib + Ic)}{Ia + Ib + Ic + Id} \end{aligned} \quad (8)$$

Thus, the position X, Y of the center of gravity of the light spot 102 on the photosensor 100 is obtained.

Figure 6:
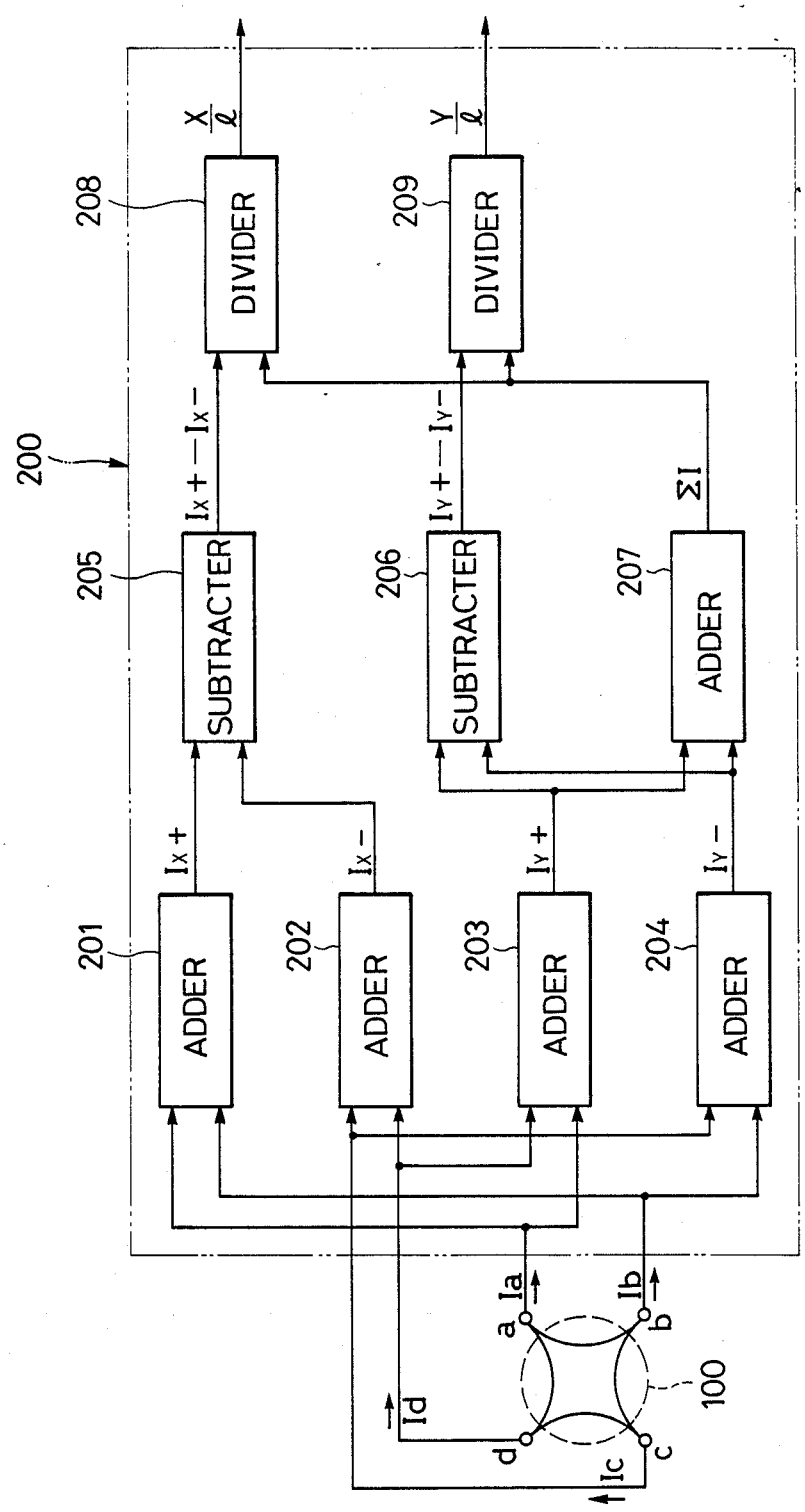

The arithmetic unit 200 of FIG. 6 is used to carry out the calculations of Equations (2) to (8). More particularly, it is constituted by adders 201, 202, 203 and 204 for calculating Ix+, Ix−, Iy+ and I− of Equations (3) and (7), subtracters 205 and 206 for calculating Ix+-−Ix−, Iy30 −Iy31, an adder 207 for calculating the total current IΣ of Equation (2), and dividers 208 and 209 for calculating X/l and Y/l to determine the position of the light spot 102 of Equations (6) and (8).

Figure 5:
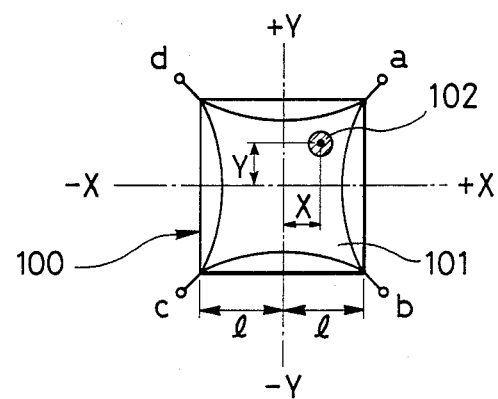

The photosensor 100 and arithmetic unit 200 shown in FIGS. 5 and 6 are known, for example, from the semiconductor position detecting elements produced by Hamamatsu Photonics Co.,Ltd.

Figure 7:
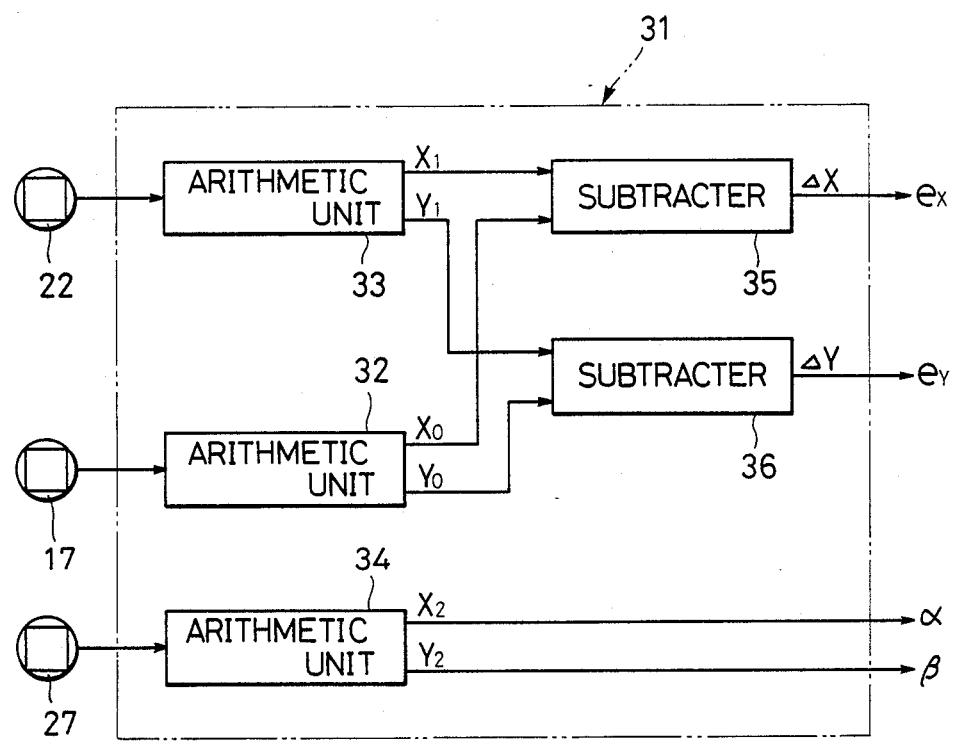
Figure 8:
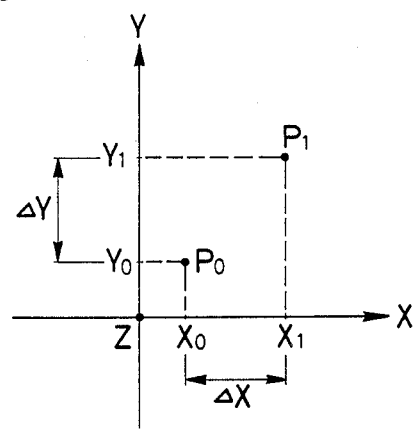

Referring to FIGS. 7 and 8, there are shown the arrangement and operating principles of a circuit employing the photosensors as shown in FIG. 5, namely, the correcting photosensor 17, the position detecting photosensor 22 and the angle detecting photosensor 27 for computing four of the abovementioned six error components.

In FIG. 7, indicated at 31 is an arithmetic device of this embodiment, which is constituted by arithmetic units 32, 33, 34 of the same construction as the arithmetic unit 200 representatively shown in FIG. 6, and subtracters 35 and 36 which are provided in a stage posterior to the arithmetic units 32 and 33. The output detection signal from the correcting photosensor 17 is supplied to the input of the arithmetic unit 32, which produces as its output Xo and Yo (corresponding to X/l and Y/l which are produced at the output of the arithmetic unit 200 as the position of the light spot) indicative of the position of the received light spot. Similarly, the detection signals of the position detecting photosensor 22 and the angle detecting photosensor 27 are supplied to the inputs of the arithmetic units 33 and 34 respectively, which produce outputs X1, Y1, X2 and Y2 as the light spot position. On the other hand, the subtracter 35 produces as its output the X-axis displacement error ex, the subtracter 36 produces the Y-axis displacement error ey, and the arithmetic unit 34 produces the pitching error α and the yawing error β.

Reference is now made to FIG. 8 to explain the principles of calculating the error components ex and ey by the use of the above-described arithmetic device 31.

In FIG. 8, if the light spot position from the correcting photosensor 17 is Po (Xo, Yo) and the light spot position from the position detecting photosensor 22 is P1 (X1, Y1), the differences αX and αY (displacements) between the measuring positions of Po and P1 in the directions of X- and Y-axes are $$\begin{aligned} \Delta X &= X1 - Xo \\ \Delta Y &= Y1 - Yo \end{aligned} \quad (9)$$

Therefore, the calculations according to Equations (9) are executed by the subtracters 35 and 36 of the arithmetic device 31.

In this instance, ΔX is the displacement in the horizontal direction (in the direction of the X-axis), so that, if the error component in the direction of the X-axis of the rectilinearly moving body 1 is approximately Δex, $$\Delta ex \approx \Delta X \quad (10)$$

Similarly, ΔY is the displacement in the vertical direction (in the direction of the Y-axis), so that, if the error component of the rectilinearly moving body 1 in the direction of the Y-axis is approximately Δey, $$\Delta ey \approx \Delta Y \quad (11)$$

Further, the pitching error c is an error due to pitching about the X-axis, and the yawing error β is an error due to yawing about the Y-axis. These error components are computed in the following manner.

As will be understood from FIG. 5, when the light spot 102 of the photosensor 100 is observed by the general concept, the pitching α' and the yawing β' are expressed as $$\begin{aligned} \alpha' &= \tan^{-1}\frac{X}{l} \approx \frac{X}{l} \\ \beta &= \tan^{-1}\frac{Y}{l} \approx \frac{Y}{l} \end{aligned} \quad (12)$$

On the other hand, as clear from Equation (1), the position of the light spot of the angle detecting photosensor 27 is at the position of the displacement d depending upon the angle of inclination of the angle detecting reflecting mirror 4, so that the output of the arithmetic unit 34, namely, the displacement X2 in the X-axis direction and the displacement Y2 in the Y-axis direction are expressed as $$\begin{aligned} \alpha &= X2 \\ \alpha &= Y2 \end{aligned} \quad (13)$$

and directly obtained from the arithmetic unit 34.

Thus, by the use of linearly polarized light from a laser generator, the rectilinear motion measuring apparatus of this embodiment is capable of simultaneously measuring the four components ex, ey, α and β of the six error components, the error factors of the rectilinearly moving body 1, thereby permitting to position the rectilinearly moving body 1 with extremely high accuracy. Therefore, it can enhance the accuracy of linear motions of machine tools, measuring machines and the like, while permitting to reduce the number of steps in an accuracy test.

The optical system including the laser generator 12 and the respective photosensors 17, 22 and 27 is fixedly mounted on the measuring device casing 11, so that, if the position of the light spot Po of the correcting photosensor 17 is shifted by some reason on the side of the laser generator 12, the position of the light spot P1 of the position detecting photosensor 22 is likewise shifted by the same amount of displacement. Accordingly, the displacement indicated by Equation (9) is free of the influences of the laser light source of the laser generator 12, giving only the displacement errors ex and ey actually occurred to the linearly moving body 1 in the directions of the X- and Y-axes.

Further, the optical path containing the displacement magnifying means 21 is formed separately from the optical path containing the angle transfer means 26 such that the optical path of the displacement magnifying means 21 is not obstacled by the collimator lens 25 which constitutes the angle transfer means 26. Therefore, the position detecting photosensor 22 can receive light of the displacement of the displacement detecting corner cube prism 3 after ×4 magnification, increasing its resolution power.

Figure 9:
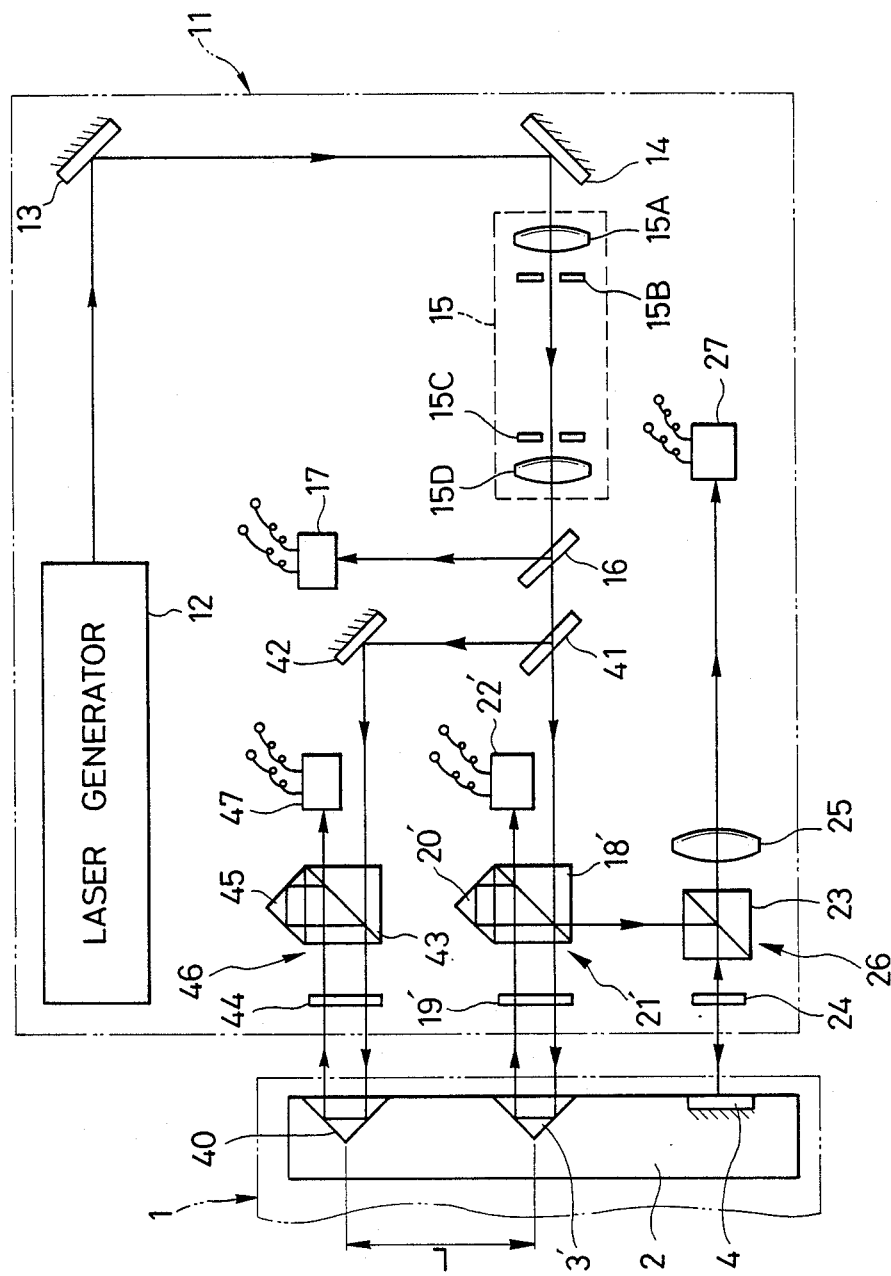
Figure 10:
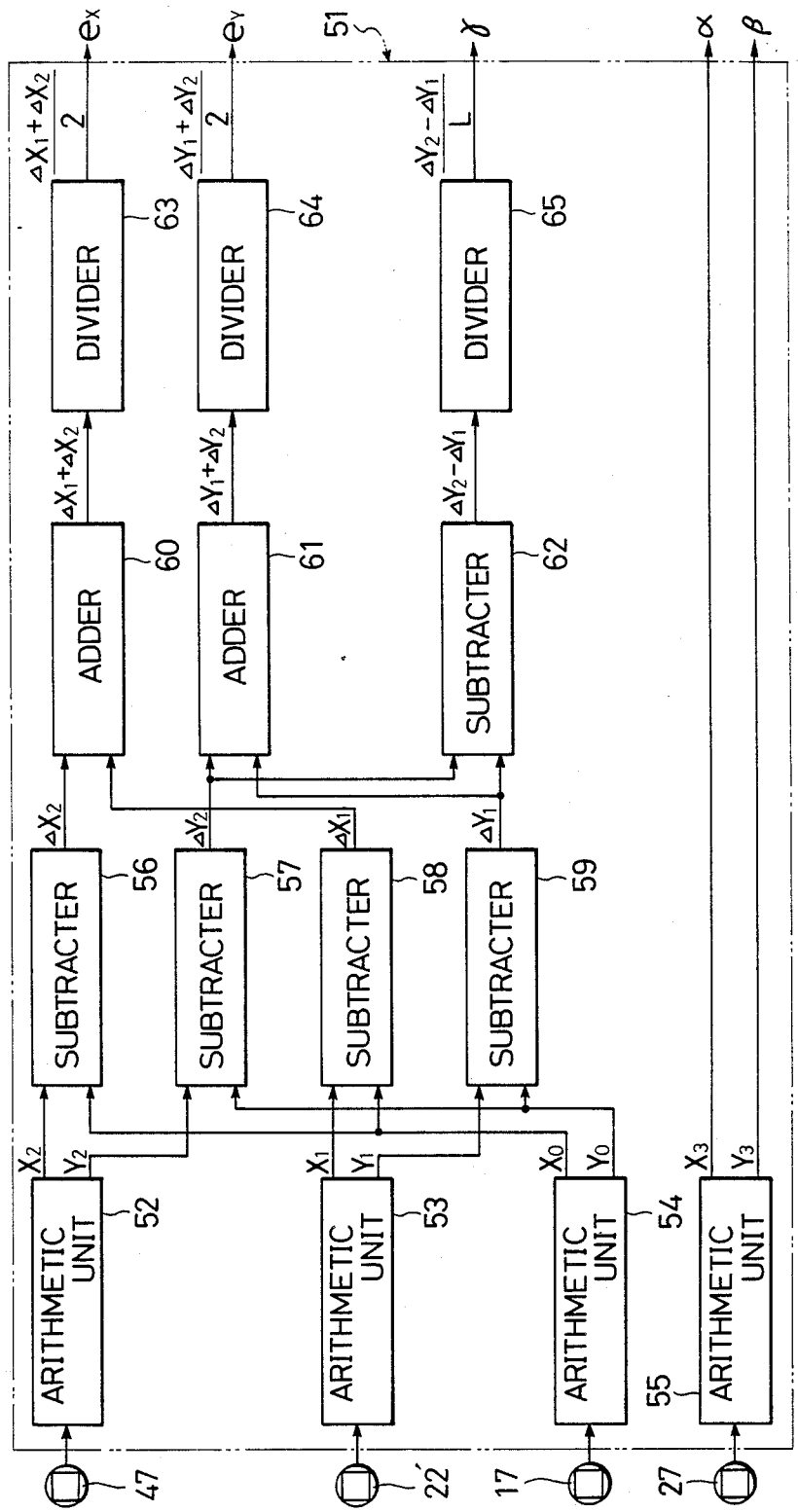
Figure 11:
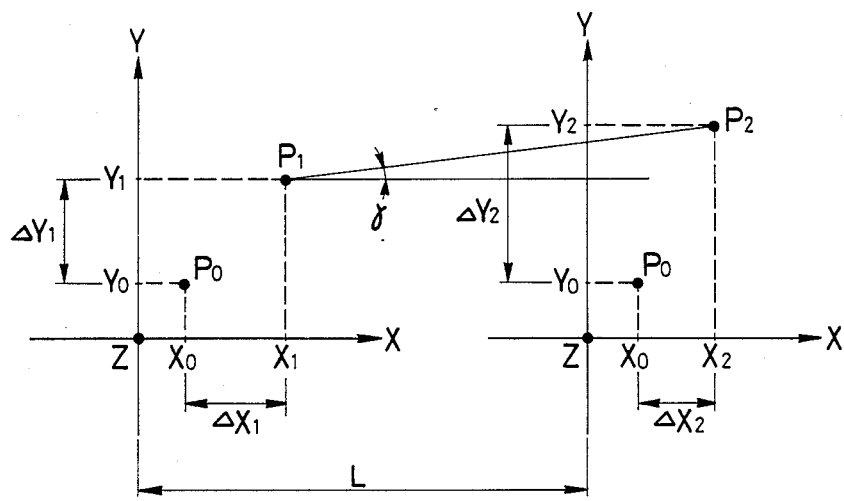
Figure 12:
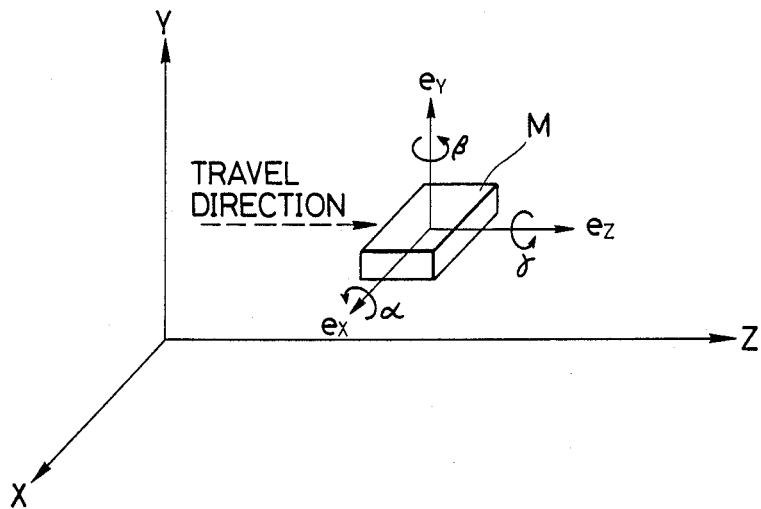
FIG. 12 is a diagram explanatory of the error components in the directions of X-, Y- and Z-axes.

Referring now to FIGS. 9 through 11, there is shown a second embodiment of the invention, in which the component parts common to the foregoing first embodiment are designated by common reference numerals and their detailed description is omitted to avoid unnecessary repetitions.

A feature of this embodiment resides in that it can compute the rolling error γ in addition to the four error components ex, ey, α and β as in the first embodiment.

In FIG. 9, denoted at 3' is a first displacement detecting corner cube prism which is provided on the detector block 2 and which corresponds to the corner cube prism 3 of the first embodiment. Indicated at 40 is a second corner cube prism which is also provided on the detector block 2. This corner cube prism 40 is spaced from the first corner cube prism 3' by a predetermined distance L.

On the other hand, designated at 21' is a first displacement magnifying means of this embodiment, which is constituted by, similarly to the displacement magnifying means 21 of the first embodiment, a polarizing beam splitter 18', a quarter-wave plate 19' and a displacement magnifying corner cube prism 20', and located opposingly to the first displacement detecting corner cube prism 3' Indicated at 22' is a first position detecting 4-quadrant photosensor which is located to receive luminous flux transmitted through the polarizing beam splitter 18', in the same manner as the photosensor 22 of the first embodiment.

Denoted at 41 is another half mirror which is located in the optical path of the luminous flux magnifier 15 in a position next to the half mirror 16; at 42 is a reflecting mirror for turning the optical path of the reflected luminous flux from the half mirror 41 toward the second displacement detecting corner cube prism 40; at 43 is a second polarizing beam splitter located in the optical path reflected from the reflecting mirror 42; at 44 is a second quarter-wave plate located between the polarizing beam splitter 43 and the corner cube prism 40; and at 45 is a second displacement magnifying corner cube prism fixed on the upper member of the polarizing beam splitter 43. The second displacement magnifying means 46 of this embodiment is constituted by these reflecting mirror 42, polarizing beam splitter 43, quarter-wave plate 44 and corner cube prism 45. The second displacement magnifying means 46 performs functions similar to the aforementioned first displacement magnifying means 21', enlarging the displacement ΔS' of the second displacement detecting corner cube prism 40 by four times, namely, to 4ΔS.

On the other hand, indicated at 47 is a second position detecting 4-quadrant (two-dimensional) photosensor for receiving the luminous flux transmitted through the polarizing beam splitter 43 of the second displacement magnifying means 46. In cooperation with the aforementioned first photosensor 22', this photosensor 47 serves for computation of the X-axis displacement error ex, Y-axis displacement error ey and rolling error γ.

Referring to FIGS. 10 and 11, the description is now directed to the circuit arrangement and the operating principles for computing five components of the six error components, using the correcting photosensor 17, first position detecting photosensor 22', second position detecting photosensor 47 and angle detecting photosensor 27 shown in FIG. 9.

In FIG. 10, indicated at 51 is an arithmetic device which is constituted by: arithmetic units 52, 53, 54 and 55 having the same construction as the arithmetic unit 200 representatively shown in FIG. 6; subtracters 56, 57, 58 and 59 provided in the stage next to the arithmetic units 52 to 54; adders 60 and 61 and a subtracter 62 provided in the stage next to the subtracters 56 to 59; and dividers 63, 64 and 65 provided in the stage next to the adders 60 and 61 and the subtracter 62. The detection signal from the correcting photosensor 17 is supplied to the input of the arithmetic unit 54, which produces an output of Xo, Yo (corresponding to the light spot position X/l, Y/l produced by the arithmetic unit 200) as the received light spot position. Similarly, the detection signals from the first and second position detecting photosensors 22' and 47 and the angle detecting photosensor 27 are supplied to the arithmetic units 53, 52 and 55, respectively, which in turn produce light spot signals X1, Y1, X2, Y2, X3 and Y3. On the other hand, the X-axis displacement error ex is produced at the output of the divider 63, the Y-axis displacement error ey at the output of the divider 64, the rolling error γ at the output of the divider 65, the pitching error α and yawing error β at the output of the arithmetic unit 55.

Referring to FIG. 11, the respective error components ex, ey and γ are computed according to the following principles by the use of the arithmetic device 51.

In FIG. 11, if the light spot position of the correcting photosensor 17 is Po (Xo, Yo), the light spot positions of the first and second position detecting photosensors 22' and 47 are P1 (X1, Y1) and P2 (X2, Y2), and the distance between these photosensors 22' and 47 is L, the differences (displacements) ΔX1 and ΔY1 between the measuring positions of the light spots P and P1 in the directions of the X- and Y-axes are $$\Delta X1 = X1 - Xo \atop \Delta Y1 = Y1 - Yo \Big\} \quad (14)$$

and the differences (displacements) ΔX2 and ΔY2 between the measuring positions of the light spots Po and P2 are $$\Delta X2 = X2 - Xo \atop \Delta Y2 = Y2 - Yo \Big\} \quad (15)$$

Therefore, the calculations of Equations (14) are executed by the subtracters 58 and 59 of the arithmetic device 51, while the calculations of Equations (15) are executed by the subtracters 56 and 57.

In this instance, ΔX1 and ΔX2 are displacements in the horizontal direction (in the direction of the X-axis), so that the rectilinearly moving body 1 is supposed to have approximately an error component Δex' in the direction of the X-axis, which is $$\Delta ex' \approx \Delta X1 \approx \Delta X2 \quad (16)$$

However, in order to enhance the accuracy of the measurement, the value resulting from the adding operation by the adder 60 may be divided by 2 to obtain a mean error component Δex at two different positions in the direction of the X-axis, as follows.

$$\Delta ex = \frac{\Delta X1 + \Delta X2}{2} \quad (17)$$

Similarly, ΔY1 and ΔY2 are displacements in the vertical direction (in the direction of the Y-axis), so that, if the rectilinearly moving body 1 approximately has an error component Δey' in the direction of the Y-axis, $$\Delta ey' \approx \Delta Y1 \approx \Delta Y2 \quad (18)$$

and a mean error component Δey in the direction of the Y-axis can be computed by means of the adder 61 and divider 64 in the same manner as mentioned above.

$$\Delta ey = \frac{\Delta Y1 + \Delta Y2}{2} \quad (19)$$

With regard to the rolling error γ resulting from rolling about the Z-axis, if the error component Δex in the direction of the X-axis is sufficiently small compared with the distance L between the first and second position detecting photosensors 22' and 47, it can be obtained as $$\gamma = \tan^{-1}\frac{\Delta Y2 - \Delta Y1}{L} \approx \frac{\Delta Y2 - \Delta Y1}{L} \quad (20)$$

Therefore, the calculation of Equation (20) is executed by the subtracter 62 which effects the subtraction of ΔY2−ΔY1 and the divider 65 which effects the division by L.

Further, similarly to the first embodiment, the pitching and yawing errors α and β can be taken out directly from the arithmetic unit 55 as $$\alpha = X3 \atop \beta = Y3 \Big\} \quad (21)$$

In this manner, this embodiment can measure the rolling error γ in addition to the four error components ex, ey, α and β in the first embodiment, namely, can simultaneously measure the four error components ex, ey, α, β and γ of the six error factors, permitting to position the rectilinearly moving body 1 with extremely high accuracy.

Further, the optical system including, besides the laser generator 12, the respective photosensors 17, 22', 47 and 27 is fixedly mounted on the measuring device casing 11, so that a shift of the position of the light spot Po of the correcting photosensor 17 due to a cause on the side of the laser generator 12 results in a displacement of the same amount of the positions of the light spots P1 and P2 of the first and second position detecting photosensors 22' and 47. Therefore, the displacements expressed by Equations (14) and (15) are free of the influences of laser light source of the laser generator 12, giving only the X-axis direction displacement error ex, Y-axis direction displacement error ey and rolling error γ actually occurred to the rectilinearly moving body 1.

The optical path system containing the first and second displacement magnifying means 21' and 46 is provided separately from the optical path containing the angle transfer means 26 in such a manner that the optical paths for the first and second displacement magnifying means 21' and 46 are not obstacled by the collimator lens 25 which constitutes the angle transfer means 26. Consequently, the position detecting photosensors 22' and 47 can receive the light spot after magnifying the displacement of the first and second corner cube prisms 3' and 40 by four times to enhance the resolution.

Moreover, the X-axis direction displacement error ex and the Y-axis direction displacement error ey which are produced as outputs of the dividers 63 and 64 can be obtained as mean error at two different positions in the X- and Y-axis directions, improving the accuracy of measurement of the displacement errors ex and ey to a marked degree.

In the foregoing embodiments, the luminous flux is shuttled two times between the displacement detecting corner cube and the displacement magnifying means to magnify the displacement of the corner cube prism by four times. However, the arrangement of the displacement magnifying means can be modified to shuttle the luminous flux n times for ×2n magnification.

For calculating the X- and Y-axis displacement errors ex and ey with strict accuracy, the arithmetic device 51 of the second embodiment is adapted to calculate mean values by the use of the adders 60 and 61 and dividers 63 and 64. Alternatively, as implied by Equations (16) and (18), it is possible to use either the X-axis direction displacement ΔX1 or ΔX2 for the displacement error ex and either the Y-axis direction displacement ΔY1 or ΔY2 for the displacement error ey.

Further, it is possible to employ rectangular prisms for the displacement detecting corner cube prisms 3, 3' and 40, suitably arranging the reflecting mirrors 13 and 14 and the luminous flux magnifier 15.

An advantage of the invention resides in that four or five of the six error components which occur to a rectilinearly moving body can be simultaneously measured. Another advantage of the invention resides in that it becomes possible to eliminate the factors of measurement errors caused by the luminous flux generating means. The invention has still another advantage in that the resolution can be enhanced markedly by providing the optical path system of the angle detecting means separately from the optical path system of the displacement magnifying means.

Although the invention has been described and shown by way of preferred embodiments, it is to be understood that various modifications an alterations are possible without departing from the basic concept of the invention.

What is claimed is:

1. A rectilinear motion measuring device, comprising in combination:
   a displacing prism and a reflecting mirror provided on the side of a rectilinearly moving body for movement therewith;
   a luminous flux generating means for generating a luminous flux of linearly polarized light with a vibrational plane of a predetermined angle;
   a corrective position detection means for detecting a displacement of the light source of said luminous flux generating means on the basis of the luminous flux projected therefrom;
   a displacement magnifying means adapted to magnify the displacement of the displacing prism on the side of the rectilinearly moving body by reciprocating the luminous flux from the luminous flux generating means for n-times to and from the displacing prism to magnify the displacement of the prism by 2n times;
   a position detection means for detecting the luminous flux led out on a magnified scale from said displacement magnifying means;
   an angle transfer means adapted to reflect the luminous flux projected from the displacement magnifying means by the reflecting mirror on the side of the moving body, passing the reflected light through a lens to transfer the angle of inclination of the reflecting mirror;
   an angle detection means for detecting the angle of inclination transferred thereto by said angle transfer means; and
   an arithmetic means adapted to calculate, on the basis of output signals of said corrective position detection means and the position detection means, displacement errors in the horizontal and vertical directions of said rectilinearly moving body, and, on the basis of output signal of said angle detection means, pitching and yawing errors of said moving body.

2. The rectilinear motion measuring device of claim 1, wherein said displacement magnifying means comprises: a polarizing beam splitter for passing therethrough the luminous flux from said luminous flux generating means; a displacement magnifying corner cube prism securely fixed on one side of said polarizing beam splitter; and a quarter-wave plate located between said polarizing beam splitter and said displacement prism; said luminous flux being shuttled to and from said displacement prism two times to enlarge the displacement thereof by four times.

3. The rectilinear motion measuring device of claim 1, wherein said angle transfer means comprises: a polarizing beam splitter for passing therethrough the luminous flux reflected along a separate optical path by said displacement magnifying means; a quarter-wave plate located between said polarized beam splitter and said reflecting mirror; and a lens for converging toward said angle detection means the luminous flux transmitted through said polarizing beam splitter.

4. A rectilinear motion measuring device, comprising in combination:
   first and second displacing prisms and a reflecting mirror mounted on a rectilinearly moving body for movement therewith;
   a luminous flux generating means for generating a luminous flux of linearly polarized light with a vibrational plane of a predetermined angle;
   a corrective position detection means for detecting a displacement of the light source of said luminous flux generating means on the basis of the luminous flux projected therefrom;
   a first displacement magnifying means adapted to shuttle the luminous flux from the luminous flux generating means n-number of times to and from the first displacing prism on the side of said rectilinearly moving body to enlarge the displacement of said prism by 2n times;
   a first position detection means for detecting the luminous flux led out on a magnified scale from said first displacement magnifying means;
   a second displacement magnifying means adapted to shuttle the luminous flux from said luminous flux generating means n-number of times to and from said second displacing prism on the side of said rectilinearly moving body to enlarge the displacement of said second prism by 2n times;
   a second position detection means for detecting the luminous flux led out on a magnified scale from said second displacement magnifying means;
   an angle transfer means adapted to reflect the luminous flux projected from one of said first and second displacement magnifying means by the reflecting mirror on the side of the moving body, passing the reflected light through a lens to transfer the angle of inclination of the reflecting mirror;
   an angle detection means for detecting said angle of inclination transferred from said angle transfer means; and
   an arithmetic means arranged to calculate, on the basis of output signals from said first and second position detection means, displacement errors in the horizontal and vertical directions and a rolling error of said rectilinearly moving body, and to calculate, on the basis of output signal of said angle detection means, pitching and yawing errors of said rectilinearly moving body.

* * * * *